(12) United States Patent
Cocchi et al.

(10) Patent No.: US 8,739,565 B2
(45) Date of Patent: Jun. 3, 2014

(54) MACHINE FOR PRODUCING AND DISPENSING LIQUID AND SEMI-LIQUID CONSUMER FOOD PRODUCTS

(75) Inventors: Gino Cocchi, Bologna (IT); Gianni Zaniboni, Borgonuovo di Sasso Marconi (IT); Roberto Lazzarini, Reggio Emilia (IT)

(73) Assignee: Carpigiani Group—Ali S.p.A. (IT)

( * ) Notice: Subject to any disclaimer, the term of this patent is extended or adjusted under 35 U.S.C. 154(b) by 115 days.

(21) Appl. No.: 12/320,303

(22) Filed: Jan. 23, 2009

(65) Prior Publication Data

US 2009/0193828 A1 Aug. 6, 2009

(30) Foreign Application Priority Data

Jan. 31, 2008 (IT) .............................. BO2008A0067

(51) Int. Cl.
*F25B 41/04* (2006.01)
*F25B 49/00* (2006.01)
*F25B 1/10* (2006.01)

(52) U.S. Cl.
USPC ................. 62/222; 62/228.3; 62/340; 62/510

(58) Field of Classification Search
USPC ........... 62/340, 352, 114, 175, 199, 510, 222, 62/228.3
See application file for complete search history.

(56) References Cited

U.S. PATENT DOCUMENTS

| | | | |
|---|---|---|---|
| 6,298,674 B1 * | 10/2001 | Finkenberger et al. | 62/115 |
| 6,385,980 B1 | 5/2002 | Sienel | |
| 6,735,967 B1 * | 5/2004 | Bischel et al. | 62/196.4 |
| 7,013,664 B2 * | 3/2006 | Matsumoto et al. | 62/278 |
| 7,047,758 B2 * | 5/2006 | Ross | 62/342 |
| 7,101,162 B2 * | 9/2006 | Matsumoto et al. | 418/60 |
| 7,600,390 B2 * | 10/2009 | Manole | 62/228.1 |
| 2002/0050143 A1 | 5/2002 | Watanabe et al. | |
| 2003/0177782 A1 | 9/2003 | Gopalnarayanan et al. | |
| 2005/0081554 A1 | 4/2005 | Ross | |
| 2005/0172661 A1 | 8/2005 | Matsumoto et al. | |
| 2006/0086110 A1 | 4/2006 | Manole | |
| 2006/0236708 A1 * | 10/2006 | Mizuno et al. | 62/228.3 |
| 2008/0289350 A1 * | 11/2008 | Shapiro | 62/246 |

OTHER PUBLICATIONS

European Search Report dated Feb. 23, 2012 from counterpart application.

* cited by examiner

*Primary Examiner* — Marc Norman
(74) *Attorney, Agent, or Firm* — Timothy J. Klima; Shuttleworth & Ingersoll, PLC

(57) ABSTRACT

A machine for producing liquid and semi-liquid consumer food products comprises one or more containers (2) for a basic product of the consumer product to be made; a refrigeration system (3) acting on the containers (2) to reduce the temperature of the basic product; the refrigeration system (3) comprising a predetermined refrigerant; the refrigerant being carbon dioxide and the refrigeration system (3) being set up to carry out a transcritical refrigeration cycle on the refrigerant.

30 Claims, 3 Drawing Sheets

MACHINE FOR PRODUCING AND DISPENSING LIQUID AND SEMI-LIQUID CONSUMER FOOD PRODUCTS

BACKGROUND OF THE INVENTION

The present invention relates to a machine for producing and dispensing liquid and semi-liquid consumer food products.

The present invention relates in particular, although without limiting the scope of the inventive concept, to machines for producing and dispensing crushed-ice drinks, sorbets, ice creams, soft ice creams, cream, ice cream cakes, yoghurt and the like and to machines for producing and preserving mixtures for ice cream, creams, sauces, soups and mixtures in general and the like.

As is known, machines of the above-mentioned type comprise one or more containers for the basic product, consisting for example of liquid cream, mixtures of products for ice cream, syrups and the like, and a feed circuit along which there are devices, including refrigeration means, for basic product treatment and processing and at the outfeed end of the circuit there are dispensing means, consisting of nozzles or taps designed to allow the end product (whipped cream, ice cream, crushed-ice drink, etc.) to be drawn out.

Such machines comprise a refrigeration system needed to lower the temperature of the basic product.

The refrigeration system of the prior art machines comprises a circuit filled with a suitable refrigerant which is processed according to a known refrigeration cycle.

The refrigerants used are, for example, CFCs (chlorofluorocarbons), fully halogenated and without hydrogen in the molecule (for example, R11, R12, R12B1), HCFCs (hydrochlorofluorocarbons), partly halogenated and containing hydrogen in their molecule (for example, R22), HFCs (hydrofluorocarbons) partly halogenated, without chlorine, and containing hydrogen in the molecule (for example, R32, R134a, R410A, R407C).

Disadvantageously, such refrigerants used in the machines are synthetic and are expensive, and their availability is limited.

Moreover, it should be noticed that these refrigerants have a significant impact on the environment, for example relating to depletion of the atmosphere's ozone layer and an increase in the greenhouse effect.

The refrigerants used are, for example, hydrocarbons (for example, propane R290 and isobutane R600a).

Disadvantageously, such refrigerants used in the machines are inflammable and potentially explosive.

SUMMARY OF THE INVENTION

In this context, the present invention has for a technical purpose to propose a machine for producing and dispensing liquid and semi-liquid consumer food products which is free of the above-mentioned disadvantages.

In particular, the present invention has for an aim to propose a machine for producing and dispensing liquid and semi-liquid consumer food products which is economical, reliable and easy to make.

Moreover, the present invention has for an aim to propose a machine for producing and dispensing liquid and semi-liquid consumer food products which is compact, having reduced dimensions and a low environmental impact.

Accordingly, the present invention achieves the technical purpose and the aim described with a machine for producing and dispensing liquid and semi-liquid consumer food products having the technical features described in one or more of the appended claims.

BRIEF DESCRIPTION OF THE DRAWINGS

Further features and advantages of the present invention are more apparent from the non-limiting description which follows of a preferred embodiment of a machine for producing and dispensing liquid and semi-liquid consumer food products, illustrated in the accompanying drawings, in which.

DESCRIPTION OF THE PREFERRED EMBODIMENTS

With reference to the accompanying drawings, the numeral 1 denotes as a whole a machine for producing and dispensing liquid and semi-liquid consumer food products in accordance with the present invention.

Figure 1:
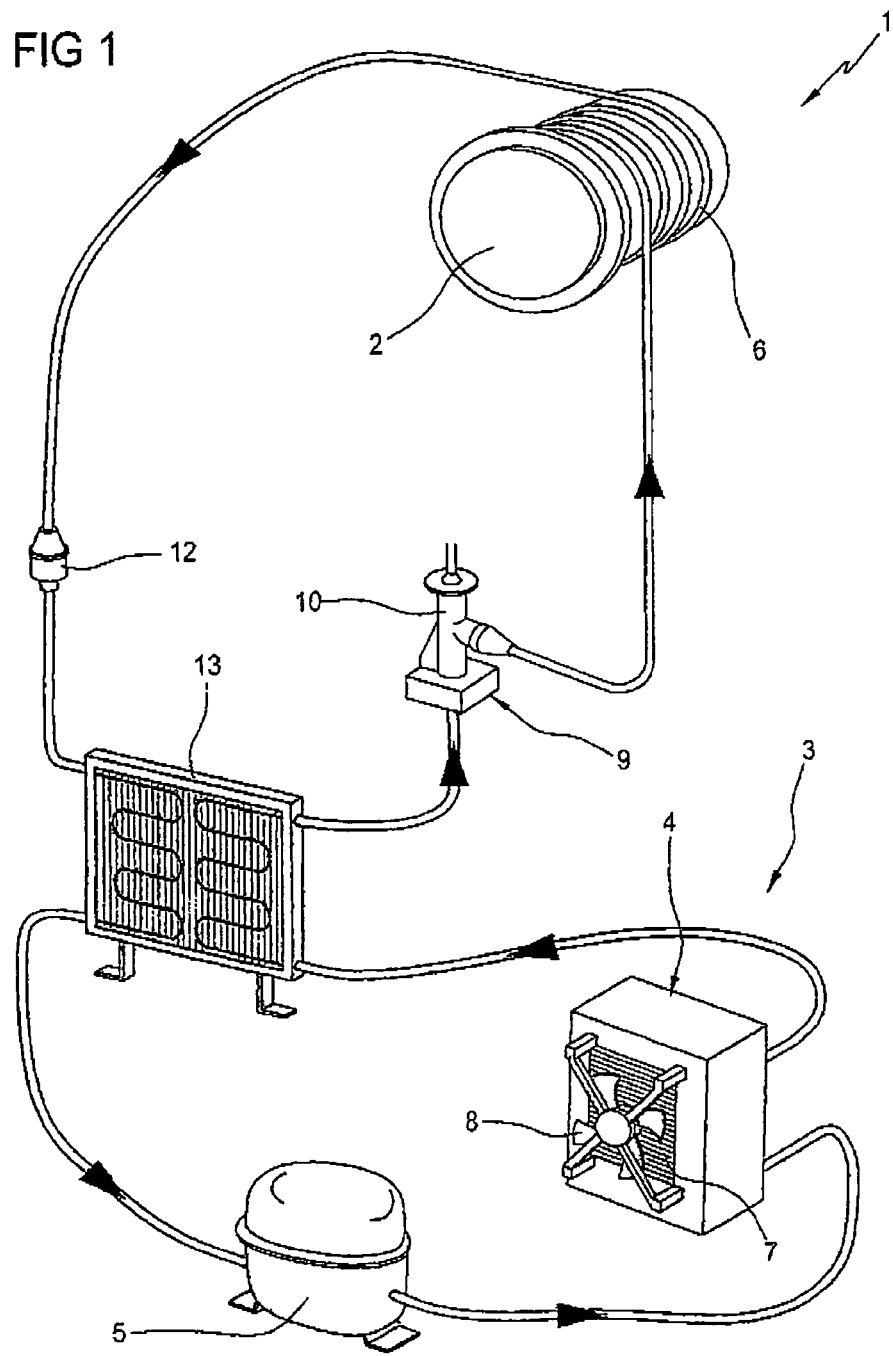
FIG. 1 is a schematic view of a first embodiment of a machine for producing and dispensing liquid and semi-liquid consumer food products in accordance with the present invention.

In particular, as illustrated in the example in FIG. 1, the machine 1 is a machine for whipping and freezing.

Figure 2:
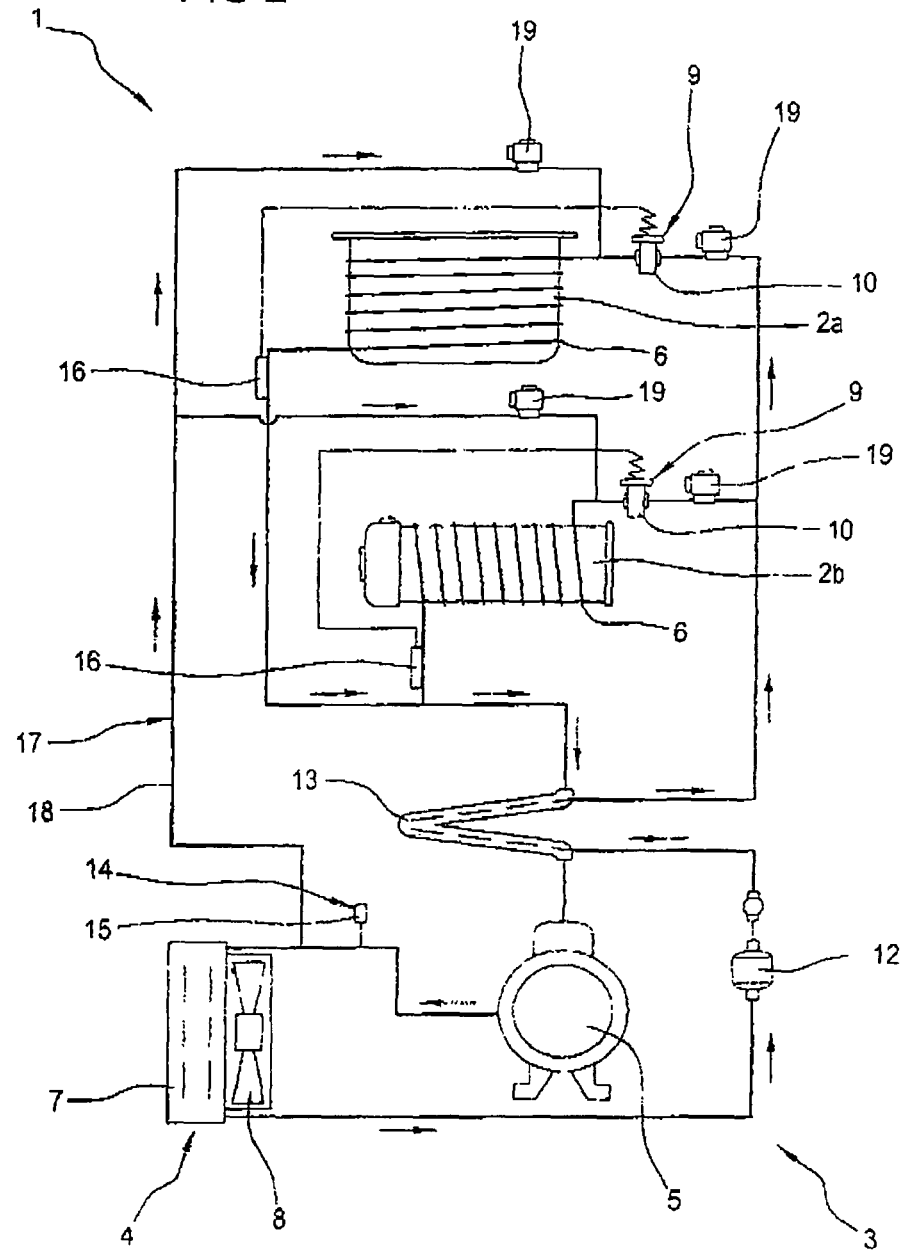
FIG. 2 is a schematic view of a second embodiment of the machine of FIG. 1.

Alternatively, in accordance with FIG. 2, the machine 1 is a self-pasteurizing soft ice cream machine for producing and distributing ice creams.

Figure 3:
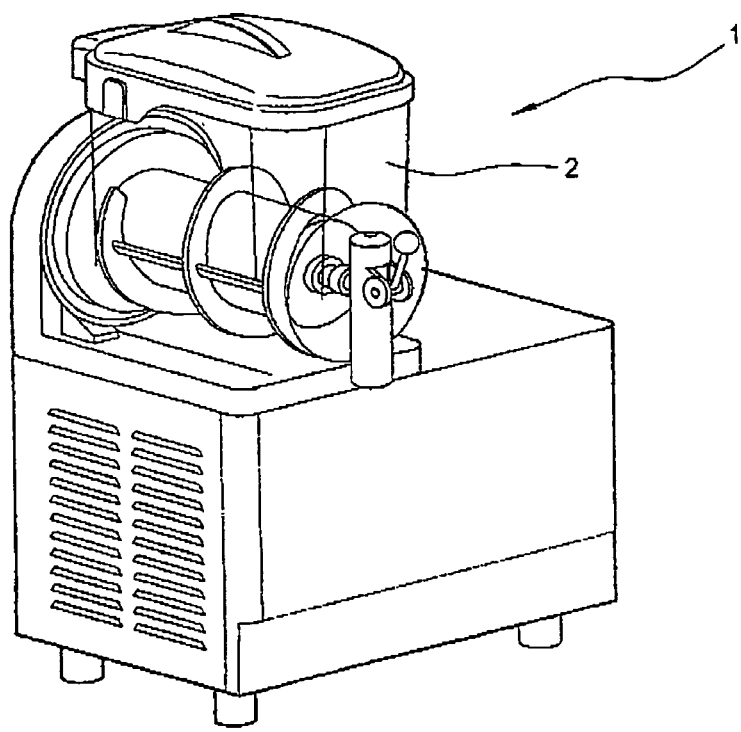
FIG. 3 is another example of a machine for producing and dispensing liquid and semi-liquid consumer food products.

In another example, shown in FIG. 3, the machine 1 is a crushed-ice drink maker for producing and/or distributing crushed-ice drinks and the like.

It should also be noticed that, in embodiments not illustrated, the machine 1 may be a cream whipping machine or a pasteurizing machine or a cream cooking machine, or finally a machine for producing ice cream cakes.

In any case, the machine 1 comprises at least one container 2 in which a basic product of the consumer product to be produced in inserted. Said basic product is mixed and cooled to obtain the consumer product using treatment and processing means not illustrated.

For that purpose, there is a mixing element (not illustrated) in the container 2, said mixing element being rotatably driven by a suitable motor.

The machine 1 also comprises a refrigeration system 3 which acts on the container 2 to remove heat from the latter and so to cool and/or freeze the basic product during a consumer product preparation step.

The refrigeration system 3 comprises a refrigerant designed to be processed according to a predetermined refrigeration cycle. In particular with reference to the embodiments described, the refrigerant is carbon dioxide ($CO_2$) and the refrigeration system 3 is set up to carry out on said refrigerant a transcritical vapor compression refrigeration cycle.

The basic difference compared with conventional refrigerants, such as HFCs (R-134a and R-404A) and hydrocarbons, is the critical temperature value which for carbon dioxide is 31° C., that is to say, equivalent to the maximum summer ambient temperature of countries with a temperate climate.

Consequently, in the conventional vapor compression cycle, the transfer of heat to the outside environment does not involve any change in state for the refrigerant, and in particular no condensation, but rather the gradual cooling of a dense gaseous phase (obviously, unless a refrigerating medium such as water can be used at a temperature not higher than 20° C.).

Therefore, the refrigeration system 3 using carbon dioxide does not comprise a condenser, but a dense gas refrigerator, called a gas-cooler 4.

With reference to the steps of the transcritical refrigeration cycle disclosed, the latter has a compression step which brings the refrigerant from a first pressure, lower than the carbon dioxide critical pressure, to a second pressure, higher than the carbon dioxide critical pressure.

Said compression step is performed using a compressor 5.

The corresponding refrigeration cycle is referred to as transcritical because it occurs between two constant pressures, the first of which is lower than the critical value and the other higher than the critical value.

Compression of the refrigerant increases its temperature.

The refrigerant then enters the gas-cooler 4 where its temperature is lowered at a constant pressure, until it reaches the dense gaseous phase described, transferring heat to the surrounding environment.

Then, due to a throttling element, the carbon dioxide undergoes an adiabatic expansion from the second pressure to the first pressure.

The refrigerant then enters an evaporator 6 connected to the container 2, to absorb the heat from the container 2, thus completing the thermodynamic cycle with an isobaric heating step.

In the embodiments described, the compressor 5 is of the single-stage reciprocating semi-hermetic type.

Alternatively, the refrigeration system 3 may comprise a plurality of single-stage compressors 5 arranged in series to regulate the pressure change.

According to another alternative, the compressor 5 may be of the two-stage type to regulate the pressure change, maintaining a single component body.

Or, the compressor 5 may be of the intercooler two-stage type. This embodiment guarantees both a substantial reduction in the end of compression temperature of the second stage and a big reduction in the overall compression work and, therefore, absorbed power.

In an embodiment not illustrated, the compressor comprises an electric motor connected to an inverter for regulating the compressor 5 motor. In other words, the inverter allows continuous control of the speed of the compressor 5 motor.

In more detail, the compressor 5 motor may be of the asynchronous or the brushless type.

The gas-cooler 4 is in fluid communication with the compressor 5 and is located downstream of the latter.

For example, the gas-cooler 4 for cooling the compressed refrigerant comprises a radiator 7 in which the compressed and hot refrigerant flows and a fan 8 for generating an air flow intended to remove a quantity of heat from the compressed refrigerant.

Alternatively, the cooling device 5 uses a flow of water to remove the heat from the compressed refrigerant and, for that purpose, comprises a hydraulic circuit (not illustrated).

The refrigeration system 3 also comprises one or more throttling elements 9 located downstream of the compressed refrigerant cooling device 5 for carrying out said adiabatic expansion step of the transcritical refrigeration cycle.

For example, the throttling element 9 comprises an expansion valve 10. With reference to the embodiments described, the expansion valve 10 is an adjustable automatic valve.

The expansion valve 10 is preferably equipped with a safety device (not illustrated) for preventing unwanted sudden changes in pressure from damaging the refrigeration system 3.

In an alternative embodiment, the throttling element, 9 comprises a thermostatic expansion valve with or without an external equalizer.

The throttling element 9 may be an electronic valve or a pulse valve or even a capillary tube 11 which causes the compressed refrigerant to expand.

Figure 4:
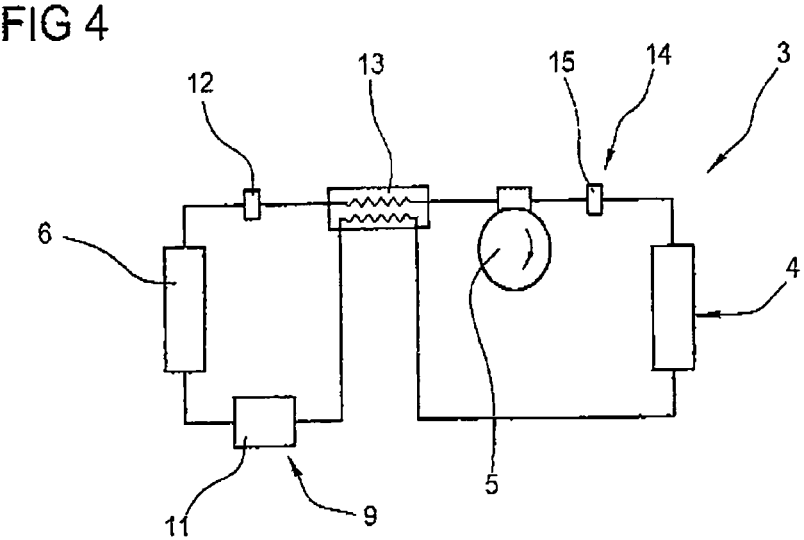
FIG. 4 is a schematic view of a detail of the machine for producing and dispensing liquid and semi-liquid consumer food products in accordance with the present invention.

The capillary tube 11 is configured as a narrowing of a refrigerant transit pipe and is schematically illustrated in FIG. 4.

The evaporator 6 is in fluid communication with the throttling element 9, receiving from the latter the expanded refrigerant and carrying out the carbon dioxide heating step.

As indicated above, said step involves removing heat from the evaporator 6 and therefore from the container 2 to cool and/or freeze the basic product contained in the container 2.

It should also be noticed that even after expansion and said heating, the refrigerant does not undergo any phase transition.

At the evaporator 6 outfeed, the refrigeration system 3 comprises a filter 12 for intercepting any portion of refrigerant in the liquid phase.

Advantageously, the filter 12 protects the compressor 5 from possible faults caused by the presence of liquid in its intake.

Downstream of the filter 12 and immediately upstream of the compressor 5, the refrigeration system 3 also comprises an intermediate heat exchanger 13.

The latter lowers the temperature of the refrigerant sucked into the compressor 5 to increase the efficiency of the compression step.

The intermediate heat exchanger 13 is of the countercurrent flow type. In more detail, a first flow consists of the expanded refrigerant flow sent to the compressor. Said first flow must be at least partly cooled before it enters the compressor.

A second flow consists of the flow of compressed and cooled refrigerant exiting the cooling device 4.

Therefore, in the intermediate heat exchanger 13 heat is transferred from the refrigerant entering the compressor to the refrigerant entering the throttling element 9.

The refrigeration system 3 also comprises means 14 for controlling the pressure of the refrigerant contained in the refrigeration system 3.

Said control means 14 check that the pressure of the refrigerant contained in the refrigeration system 3 does not exceed a predetermined safety value previously set.

The control means 14 comprise at least a pressure sensor 15 for measuring the refrigerant pressure.

Advantageously, the pressure sensor 15 is located immediately downstream of the compressor 5 and in particular on its delivery side. In said position, the pressure sensor 15 measures a substantially maximum pressure value.

The control means 14 also act on the compressor 5 to reduce the thermal power supplied to the refrigerant during compression so as to reduce the above-mentioned second pressure if the safety value is approached and/or exceeded.

Said control means 14 are present both in the case in which the throttling element 9 comprises the expansion valve 10 and in the case in which it comprises the capillary tube 11.

The refrigeration system of the machines disclosed may also be used with the "hot gas" method, that is to say, with cycle reversal, operating as a heat pump, so as to heat.

Said operation is advantageously applied to machines such as pasteurizing machines and in the above-mentioned self-pasteurizing soft ice cream machine for producing and distributing ice creams (FIG. 2).

In this case the machine 1 comprises two separate containers 2. A first container 2a is located in an upper portion of the machine 1 and is set up for preserving and pasteurizing a mixture which constitutes the basic product of the consumer product to be made.

A second container 2b (whipping and freezing cylinder) is located below the first container and is equipped with at least one motor-driven mixer and/or scraper (not illustrated) for producing soft ice cream.

The second container 2b is connected to the first container 2a by a pipe (not illustrated in the accompanying drawings) which allows the product contained in the first container 2a to reach the second container 2b.

In particular, said transfer takes place only thanks to the force of gravity. Alternatively, the machine 1 may comprise a pump to facilitate said transfer of basic product.

At a front end of the second container 2b there is at least one tap (not illustrated) to allow the consumer product made to be dispensed.

Again, the refrigeration system 3 comprises the compressor 5 for carrying out the refrigerant adiabatic compression step.

It should be noticed that the compressor 5 may be driven by an asynchronous motor or by a brushless motor and it may be driven using an electronic control device such as an inverter, driver and the like.

Mounted downstream of the compressor 5 there is the gas-cooler 4 for refrigerant isobaric cooling, having the radiator 7 and the fan 8.

After the gas-cooler 4, the compressed and cooled refrigerant enters the intermediate heat exchanger 13 then goes to the throttling element 9 and the evaporator 6 of the first container 2a and the throttling element 9 and the evaporator 6 of the second container 2b.

In the example embodiment described, the throttling elements 9 are expansion valves 10, each having an external bulb 16.

At the condenser outfeed, the refrigerant enters the respective filters 12 in accordance with what is described above.

The machine 1 also comprises a heating circuit 17 connected to the first container 2a and to the second container 2b to increase the temperature of the basic product during particular operating steps.

Said heating circuit 17 is made using a branch 18 (or by-pass) which prevents the compressed and heated refrigerant from reaching the gas-cooler 4.

In that way, since said refrigerant is not cooled, it enters the evaporators 6 of the first container 2a and of the second container 2b to heat their contents.

It should also be noticed that the refrigerant which passes in the branch 18 of the heating circuit 17 does not pass through the throttling elements 9.

The machine 1 also comprises a plurality of on-off solenoid valves 19 for regulating the flow of refrigerant.

FIG. 4 illustrates in particular the refrigeration system 3 of a crushed-ice drink maker, since it is without the heating circuit 17.

The invention achieves the preset aims and brings important advantages.

Indeed, the carbon dioxide used as the refrigerant is a gas characterized by enormous availability and a significantly lower cost, since it is a waste product of many industrial processes.

This feature significantly simplifies the production of machines for producing and dispensing liquid and semi-liquid consumer food products, since it completely eliminates the problems linked to the availability of the synthetic gases used as a refrigerant until now.

Moreover, the cost of producing the machines is also significantly lowered.

Another advantage may be attributed to the environmental compatibility of carbon dioxide and to the absence of specific regulations relating, for example, to its recovery and disposal.

It should be noticed that the carbon dioxide does not damage the atmosphere's ozone layer in any way. Moreover, the carbon dioxide used in the refrigeration system does not contribute to an increase in the greenhouse effect and consequent global warming, since said gas is advantageously recovered from industrial waste.

Plus, an advantage relating to the use of the transcritical refrigeration cycle with carbon dioxide is the fact that said gas is completely non-toxic and is not inflammable.

What is claimed is:

1. A machine for producing liquid and semi-liquid consumer food products, comprising:
   at least one container for containing a basic product of at least one chosen from a liquid and a semi-liquid consumer food product;
   a refrigeration system including a compressor, the refrigeration system acting on the container for lowering a temperature of the basic product; the refrigeration system comprising carbon dioxide as a refrigerant; the refrigeration system performing a transcritical refrigeration cycle on the refrigerant;
   a heating circuit connected to the at least one container for increasing the temperature of the basic product;
   wherein the refrigeration system comprises an evaporator in contact with the container, in fluid communication with the compressor, in which the compressed refrigerant is heated, absorbing heat from the container;
   wherein the heating circuit comprises a branch in fluid connection with a compressor delivery side;
   wherein the heating circuit is in fluid communication with the evaporator;
   and further comprising at least one valve positioned in each of the refrigeration system and the heating circuit to selectively isolate the heating circuit for the evaporator from the refrigerator system for the evaporator;
   wherein the refrigeration system also comprises a control system for preventing a pressure of the refrigerant from exceeding a predetermined safety value, the control system including a pressure sensor for measuring a pressure of the refrigerant output from the compressor, the control system acting on the compressor to reduce a thermal power supplied to the refrigerant during compression to prevent the pressure of the refrigerant from exceeding the predetermined safety value.

2. The machine according to claim 1, wherein the refrigeration system comprises at least a compressor for compressing a flow of refrigerant from a first pressure which is lower than a refrigerant critical pressure to a second pressure which is higher than the refrigerant critical pressure.

3. The machine according to claim 2, wherein the compressor is a single-stage type.

4. The machine according to claim 3, comprising a plurality of single-stage compressors mounted in tandem.

5. The machine according to claim 2, wherein the compressor is an intercooler two-stage type.

6. The machine according to claim 5, wherein the compressor comprises an electric motor and an inverter connected to the electric motor for continuously controlling a motor speed of rotation.

7. The machine according to claim 6, wherein the compressor comprises an electric motor; the electric motor being an asynchronous type.

8. The machine according to claim 6, wherein the compressor comprises an electric motor; the electric motor being a brushless type.

9. The machine according to claim 8, wherein the refrigeration system comprises a gas-cooler located downstream of the compressor for increasing/lowering a temperature of the flow of compressed refrigerant.

10. The machine according to claim 9, wherein the gas-cooler comprises at least a radiator and a fan for generating an air flow to remove heat from the flow of compressed refrigerant.

11. The machine according to claim 9, wherein the gas-cooler comprises at least a hydraulic circuit for removing heat from the flow of compressed refrigerant.

12. The machine according to claim 11, wherein the refrigeration system also comprises an intermediate heat exchanger located upstream of the compressor for cooling the flow of refrigerant entering the compressor.

13. The machine according to claim 12, wherein the refrigeration system also comprises a throttling element located upstream of the evaporator and in fluid communication with the compressor for causing the compressed refrigerant to expand.

14. The machine according to claim 13, wherein the throttling element also comprises an expansion valve.

15. The machine according to claim 14, wherein the expansion valve is a thermostatic expansion valve.

16. The machine according to claim 15, wherein the thermostatic expansion valve comprises an external equalizer.

17. The machine according to claim 13, wherein the throttling element comprises a fixed capillary tube.

18. The machine according to claim 13, wherein the throttling element comprises an adjustable automatic valve.

19. The machine according to claim 13, wherein the throttling element comprises a pulse valve.

20. The machine according to claim 13, wherein the throttling element comprises an electronic valve.

21. The machine according to claim 1, comprising a plurality of containers for a basic product of the consumer product to be made, each of the containers being connected to a respective evaporator.

22. The machine according to claim 21, wherein it is a machine for whipping and freezing.

23. The machine according to claim 21, wherein it is a self-pasteurizing soft ice cream machine for producing and distributing ice creams.

24. The machine according to claim 21, wherein it is a crushed-ice drink maker.

25. The machine according to claim 21, wherein it is a pasteurizing machine.

26. The machine according to claim 21, wherein it is a cream whipping machine.

27. The machine according to claim 21, wherein it is a cream cooking machine.

28. A method for producing liquid and semi-liquid consumer food products, comprising:
   providing at least one container for containing a basic product of at least one chosen from a liquid and a semi-liquid consumer food product;
   providing a refrigeration circuit acting on the container for lowering a temperature of the basic product; the refrigeration circuit comprising carbon dioxide as a refrigerant;
   the refrigeration circuit performing a transcritical refrigeration cycle on the refrigerant;
   providing a heating circuit connected to the at least one container for increasing the temperature of the basic product; and
   using compressed and heated refrigerant from the refrigeration circuit in the heating circuit for the increasing of the temperature of the basic product;
   providing the refrigeration system with a control system for preventing a pressure of the refrigerant from exceeding a predetermined safety value, the control system including a pressure sensor for measuring a pressure of the refrigerant output from a compressor of the refrigeration circuit for compressing the refrigerant, the control system acting on the compressor to reduce a thermal power supplied to the refrigerant during compression to prevent the pressure of the refrigerant from exceeding the predetermined safety value.

29. The method according to claim 28, wherein the temperature of the basic product is heated sufficiently to pasteurize the basic product.

30. The method according to claim 28, and further comprising providing at least one valve in each of the refrigeration circuit and the heating circuit to selectively isolate the heating circuit from the refrigeration circuit.

* * * * *